US00RE46484E

(19) United States
(12) Reissued Patent
Hanna

(10) Patent Number: US RE46,484 E
(45) Date of Reissued Patent: Jul. 25, 2017

(54) PLUMBING FITTING

(75) Inventor: Ken S. Hanna, Kohler, WI (US)

(73) Assignee: KOHLER CO., Kohler, WI (US)

(21) Appl. No.: 29/424,137

(22) Filed: Jun. 7, 2012

Related U.S. Patent Documents

Reissue of:
(64) Patent No.: Des. 617,424
Issued: Jun. 8, 2010
Appl. No.: 29/343,608
Filed: Sep. 16, 2009

(51) LOC (10) Cl. ..... 23-01
(52) U.S. Cl.
USPC ..... D23/252
(58) Field of Classification Search
USPC ..... D23/250, 252, 254, 238, 241, 242; D8/308; 16/110.1; 137/801; 4/676, 677, 4/678
See application file for complete search history.

(56) References Cited

U.S. PATENT DOCUMENTS

D290,869 S 7/1987 Paul
D316,591 S 4/1991 Ragonot
(Continued)

OTHER PUBLICATIONS

American Standard. "Moments". Lavatories with various configurations. Labeled Exhibit 31. date unknown, 1 page.
(Continued)

*Primary Examiner* — Phillip S Hyder
(74) *Attorney, Agent, or Firm* — Foley & Lardner LLP

(57) CLAIM

The ornamental design for a plumbing fitting, as shown and described.

DESCRIPTION

*Notice: More than one reissue application has been filed for the reissue of Pat. No. D617,424. Application Ser. No. 29/476,353, filed Dec. 12, 2013, is a reissue divisional of application Ser. No. 29/424,137 (the present application), filed Jun. 7, 2012, which is an application for reissue of U.S. Pat. No. D617,424.*

FIG. 1 is a right, top, front perspective view of a plumbing fitting according to my new design;
FIG. 2 is a right side elevational view thereof, the left side elevational view thereof being a mirror image of the right side shown;
FIG. 3 is a front elevational view thereof;
FIG. 4 is a rear elevational view thereof;
FIG. 5 is a top plan view thereof; [and,]
FIG. 6 is a bottom plan view thereof[.]*;*
*FIG. 7 is a right, top, front perspective view of a plumbing fitting according to another embodiment of my new design;*
*FIG. 8 is a right side elevational view thereof, the left side elevational view thereof being a mirror image of the right side shown;*
*FIG. 9 is a front elevational view thereof;*
*FIG. 10 is a rear elevational view thereof;*
*FIG. 11 is a top plan view thereof; and,*
*FIG. 12 is a bottom plan view thereof.*
[The broken line representations in the figures are for the purpose of illustration only, and form no part of the claimed design.]
*The broken lines depict portions of the plumbing fitting in which the design is embodied that are not considered part of the claimed design.*
In a preferred embodiment, the nature of this product is a plumbing fitting, such as a faucet control for a shower and/or bath.

1 Claim, 4 Drawing Sheets

Figure 1:
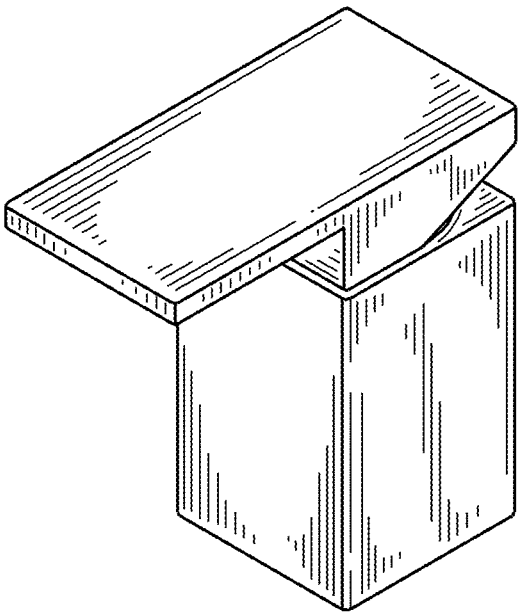
Figure 2:
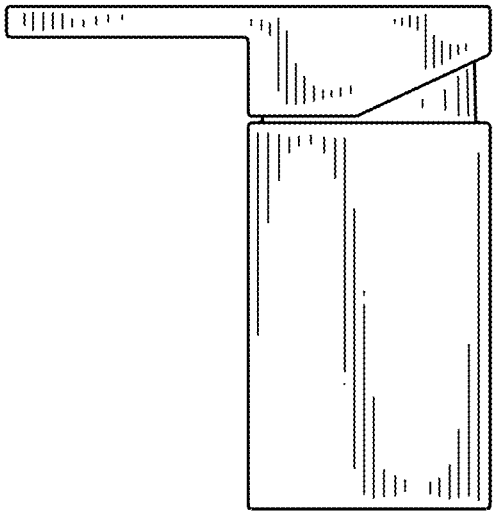
Figure 3:
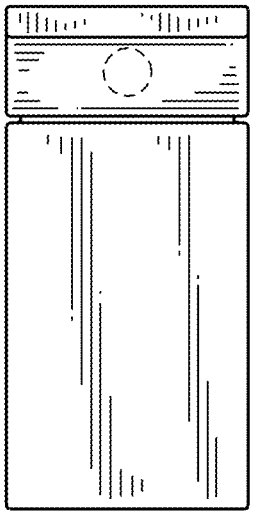
Figure 4:
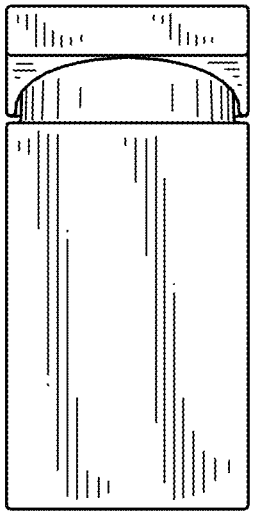
Figure 5:
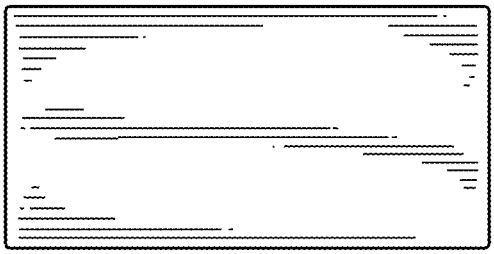
Figure 6:
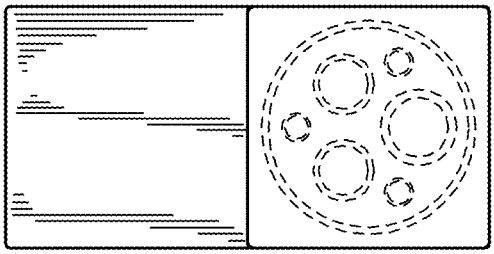

Matter enclosed in heavy brackets [ ] appears in the original patent but forms no part of this reissue; matter printed in italics indicates the additions made by reissue.

NEW

(56) References Cited

U.S. PATENT DOCUMENTS

| | | | | | |
|---|---|---|---|---|---|
| D478,966 | S | | 8/2003 | Citterio | |
| D494,254 | S | | 8/2004 | Citterio | |
| D495,780 | S | | 9/2004 | Aubry et al. | |
| D503,217 | S | | 3/2005 | Aubry et al. | |
| D512,484 | S | | 12/2005 | Paini | |
| D517,169 | S | * | 3/2006 | Ogata | D23/238 |
| D522,092 | S | | 5/2006 | Hoernig | |
| D532,084 | S | * | 11/2006 | Toyohara | D23/238 |
| D536,065 | S | | 1/2007 | Wang | |
| D541,906 | S | * | 5/2007 | Qing | D23/238 |
| D548,308 | S | * | 8/2007 | Hoernig | D23/238 |
| D556,863 | S | * | 12/2007 | Demmer | D23/235 |
| D557,383 | S | | 12/2007 | Garner | |
| D568,967 | S | * | 5/2008 | Williams et al. | D23/250 |
| D573,231 | S | * | 7/2008 | Kulig | D23/242 |
| D579,521 | S | * | 10/2008 | Kulig | D23/238 |
| D583,905 | S | | 12/2008 | Oh | |
| D590,050 | S | * | 4/2009 | Miyamoto | D23/255 |
| D596,711 | S | * | 7/2009 | Sieger | D23/238 |
| D602,121 | S | | 10/2009 | Yabe et al. | |
| D605,256 | S | | 12/2009 | Flowers et al. | |
| D611,575 | S | | 3/2010 | Schoenherr et al. | |
| D615,162 | S | | 5/2010 | Pan | |
| D617,424 | S | | 6/2010 | Hanna | |
| D626,632 | S | | 11/2010 | Hanna et al. | |
| D635,223 | S | | 3/2011 | Sandee et al. | |

OTHER PUBLICATIONS

Brizo. "Loki". Single control lavatory. Labeled Exhibit 30. date unknown, 1 page.
Colourwash.co.uk. "Tango Taps". Labeled Exhibit 1. Colourwash.co.uk catalog. date unknown, 1 page.
Danze. "Sirius Two Handle Lavatory Faucet". Model No. D301444. Labeled Exhibit 8. HomePortfolio.com online catalog. Copyright 1997-2008 HomePortfolio Inc., 1 page.
Danze. "Shower Mixer". Labeled Exhibit 1. Danze.com. retrieved Nov. 24, 2008, 1 page.
Danze. "Shower Mixer". Labeled Exhibit 2. Danze.com. retrieved Nov. 24, 2008, 1 page.
Danze. "Sirius". Lavatory (various configurations). Labeled Exhibit 9. date unknown, 1 page.
Delta. "Urban Collection—Arzo". Single control and widespread faucets. Labeled Exhibit 24. date unknown, 1 page.
Dornbracht. "Lot" Series. Labeled Exhibit 3. Dornbracht catalog, date unknown, 1 page.
Dornbracht. "Lulu". Single level lavatory and single lever vessel tall (and alternative configurations). "MEM". Single lever lavatory and alternative configurations. Labeled Exhibits 3-4. date unknown, 3 pages.
Dornbracht. "Tara". Single control lav and widespread valve (and various configurations). Labeled Exhibit 14. date unknown, 2 pages.
Gessi Rettangolo. Lavatories with various configurations. Labeled Exhibit 25. date unknown, 1 page.
Grohe. "Allure". Lavatory with various configurations. "Lineare". Lavatory. Labeled Exhibits 15-16. date unknown, 1 page.
Hansgrohe, "Hansgrohe Freestanding Tub Filler", Model No. 39451001. Labeled Exhibit 3. eFaucets.com online catalog, Copyright 2003-2008 eImprovement.com, 1 page.
Hansgrohe. "Axor Citterio M". Single-hole faucet and widespread. "Axor Citterio". Lav mixer and widespread. Labeled Exhibits 17-18. date unknown, 1 page.
Hansgrohe. "Massaud". Single control and widespread. "Axor Starck". Lav mider and sheet flow spout. Labeled Exhibits 5-6. date unknown, 1 page.
Hastings Bath Collection. "Riviera 3 Hole Basin Set—Ribbon Spout". Model No. Fan C 4204. Labeled Exhibit 4. HomePortfolio.com online catalog. Copyright 1997-2008 HomePortfolio Inc., 1 page.
Hastings Tile & Bath. "Plano In-Wall". Labeled Exhibit 2. HastingsTileBath.com online catalog. retrieved May 14, 2010, 1 page.
Hastings Tile & Bath. "Plano Shower". Labeled Exhibit 1. HastingsTileBath.com online catalog. retrieved May 14, 2010, 1 page.
Hastings. "Fantini—Riviera Ribbon". Widespread sink faucet. Labeled Exhibit 13. date unknown, 1 page.
Hastings. "Plano". Lavatory. Labeled Exhibit 32. date unknown, 1 page.
Jado. "Glance". Single control lav and widespread. Labeled Exhibit 8. date unknown, 1 page.
Kohler co. "Margaux® single-control lavatory faucet", Model No. K-16230-4. Labeled Exhibit 2. Kohler Co. online catalog, Copyright 2008, 1 page.
KWC. "Qbix / Qbix Art". Lavatories with various configurations. Labeled Exhibit 29. date unknown, 1 page.
Lacava. "Waterblade". Single control lav (various configurations). Labeled Exhibit 10. date unknown, 1 page.
Moen Showhouse. "Destiny". Single control lavatory. "Solace". Single and widespread lavatories. Labeled Exhibits 27-28. date unknown, 1 page.
Moen Showhouse. "Level". Single control and widespread configurations. Labeled Exhibit 26. date unknown, 1 page.
Newform. "E-go-n". Lavatory (various configurations). "Base". Lavatory. Labeled Exhibits 11-12. date unknown, 1 page.
Newform. Lavatories (various configurations). Labeled Exhibit 33. date unknown, 1 page.
Notice of Allowance on U.S. Appl. No. 29/343,608, mail date Feb. 17, 2010, 4 pages.
Notice of Allowance on U.S. Appl. No. 29/346,309, mail date Jun. 16, 2010, 4 pages.
Notice of Allowance on U.S. Appl. No. 29/350,460, mail date Jul. 12, 2010, 5 pages.
Notice of Allowance on U.S. Appl. No. 29/351,340, mail date Jun. 23, 2010, 7 pages.
Notice of Allowance on U.S. Appl. No. 29/354,791, mail date Dec. 3, 2010, 5 pages.
Oversized replica of computer gaming joystick. Labeled Exhibit 6. date unknown, 1 page.
Toto. "Soiree Single-Handle Lavatory Faucet". Model No. TL960SD. Labeled Exhibit 2. FixtureUniverse.com online catalog, Copyright 1999-2008, Allied Trade Group, Inc., 1 page.
Toto. "Lloyd". Widespread lavatory faucet. "Soiree". Widespread lavatory faucet. "Renesse". Single control and widespread lav (various configurations). Labeled Exhibits 19-21. date unknown, 1 page.
WS Bath Collections, "Hydrus 01-02—Basin (deck) Faucet—solid massive stainless steel". Labeled Exhibit 7. HomePortfolio.com online catalog. Copyright 1997-2008 HomePortfolio Inc., 1 page.
Zuchetti Aguablu. zut.za5432 ws and alternative configurations. Labeled Exhibit 7. date unknown, 1 page.
Zuchetti. "Soft". Lavatory. "Wosh". Lavatory. Labeled Exhibits 22-23. date unknown, 1 page.
SignatureHardware. "Whittington Collection—Flat Cubic Roman Tub Faucet". SignatureHardware.com online catalog. Copyright 1989-2008 SignatureHardware.com or its affiliates. Oversized joystick.

* cited by examiner

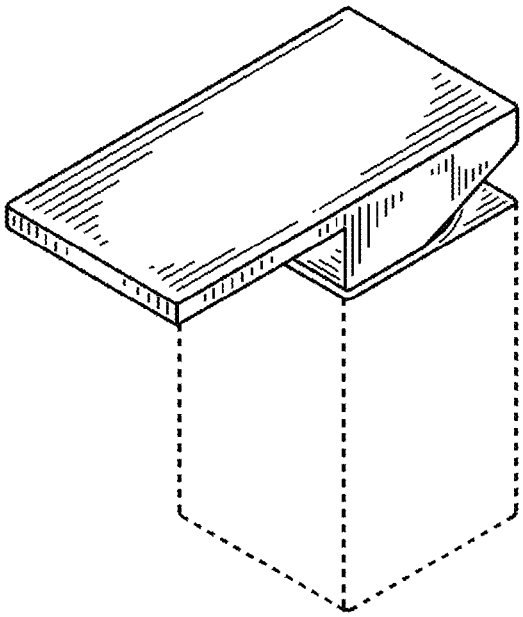
FIG. 7
NEW
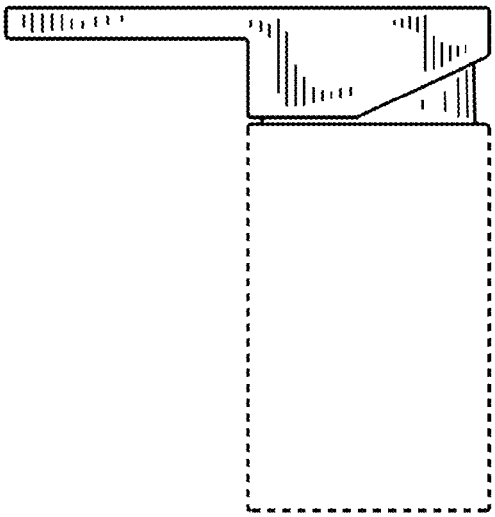
FIG. 8
NEW
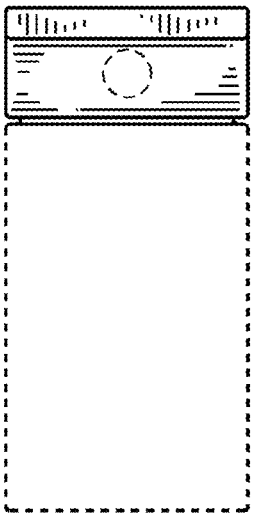
FIG. 9
NEW

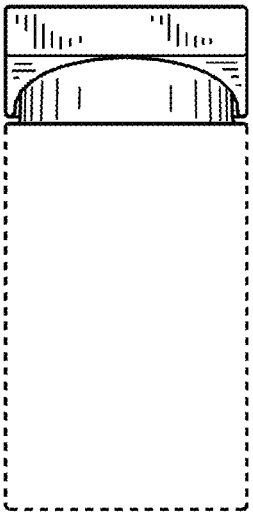
FIG. 10
NEW
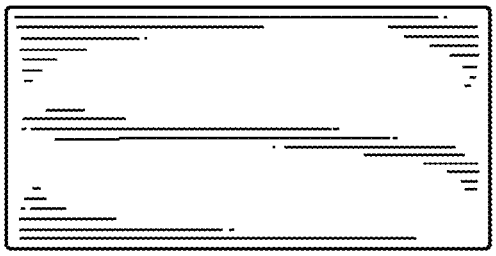
FIG. 11
NEW
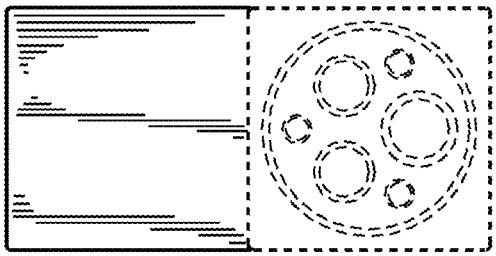
FIG. 12
NEW